(12) United States Patent
Ishida et al.

(10) Patent No.: US 6,779,812 B2
(45) Date of Patent: Aug. 24, 2004

(54) GAS GENERATOR

(75) Inventors: Takeshi Ishida, Himeji (JP); Yoshiyuki Kishino, Himeji (JP)

(73) Assignee: Nippon Kayaku Kabushiki-Kaisha, Tokyo (JP)

( * ) Notice: Subject to any disclaimer, the term of this patent is extended or adjusted under 35 U.S.C. 154(b) by 0 days.

(21) Appl. No.: 10/148,211

(22) PCT Filed: Dec. 6, 2000

(86) PCT No.: PCT/JP00/08630

§ 371 (c)(1),
(2), (4) Date: Jun. 10, 2002

(87) PCT Pub. No.: WO01/42061

PCT Pub. Date: Jun. 14, 2001

(65) Prior Publication Data

US 2002/0180191 A1 Dec. 5, 2002

(30) Foreign Application Priority Data

Dec. 10, 1999 (JP) .......................... 11-351486

(51) Int. Cl.[7] .............................................. B60R 21/26
(52) U.S. Cl. .................... 280/741; 280/728.1; 280/740
(58) Field of Search ................................. 280/740, 741, 280/728, 728.1

(56) References Cited

U.S. PATENT DOCUMENTS 5,466,420 A * 11/1995 Parker et al. ............... 422/164
5,622,380 A * 4/1997 Khandhadia et al. ....... 280/736
6,149,193 A * 11/2000 Canterberry et al. ........ 280/741
6,540,256 B2 * 4/2003 Iwai et al. .................. 280/736
6,598,901 B2 * 7/2003 Nakashima et al. ........ 280/736

FOREIGN PATENT DOCUMENTS

| EP | 1090817 A1 | * | 4/1999 |
| JP | 4-146843 | | 5/1992 |
| JP | 04-146843 | * | 5/1992 |
| JP | 7-47909 | * | 2/1995 |
| JP | 10-315899 | * | 12/1998 |
| JP | 11-217055 | * | 8/1999 |
| JP | 11-157412 | * | 11/1999 |

* cited by examiner

Primary Examiner—Michael J. Carone
Assistant Examiner—John Richardson
(74) Attorney, Agent, or Firm—Oblon, Spivak, McClelland, Maier & Neustadt, P.C.

(57) ABSTRACT

A gas generator S applicable to a side airbag or a passenger-side airbag. The gas generator S comprises an elongated cylindrical housing 1. The housing 1 has, in its interior, a first combustion chamber 3, a third combustion chamber 5 formed in a filtering member 2 and a second combustion chamber 4 which are formed in this order along an axial direction of the housing 1. The combustion chambers 3–5 are each packed with gas generating agents 6 that generate high temperature gas by burning, and ignition means 7 for igniting only the gas generating agents packed in the first combustion chamber 3 is disposed in a holder 9 fitted in the housing 1.

13 Claims, 4 Drawing Sheets

GAS GENERATOR

TECHINCAL FIELD

The present invention relates to a gas generator particularly suitably used for expanding and inflating a side airbag for side collision or a passenger-side airbag.

BACKGROUND ART

Figure 5:
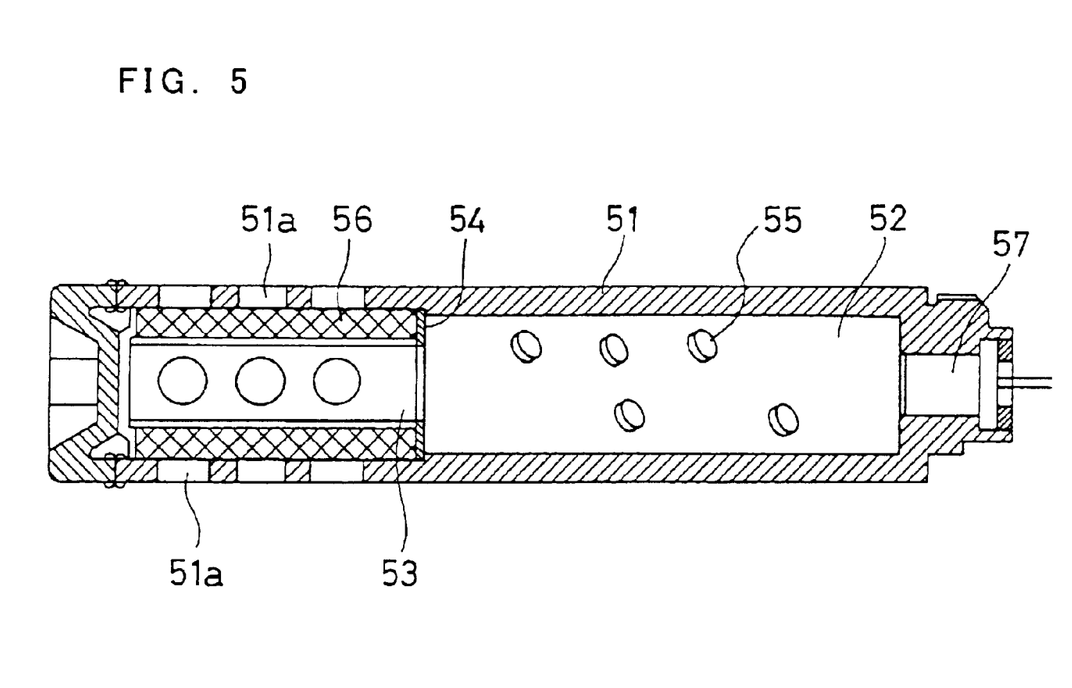
FIG. 5 is a sectional view of the conventional gas generator.

One typical example of the heretofore-proposed gas generator to expand and inflate a side airbag or a passenger-side airbag is shown in FIG. 5.

The gas generator of FIG. 5 is designed mainly for expanding and inflating a side airbag. It has an elongated cylindrical housing 51. The housing 51 has in its interior a combustion chamber 52 and a cooling-and-filtering chamber 53 into which the housing 51 is partitioned by a partition ring plate 54 along an axial direction of the housing 51. The combustion chamber 52 is packed with gas generating agents 55 that generate high temperature gas by burning. The cooling-and-filtering chamber 53 fits therein a cylindrical filtering member 56 for filtering and cooling the high temperature gas generated by the burning of the gas generating agents 55. Also, the housing 51 is provided, at an axial end thereof, with an igniter 57 for spurting flame into the combustion chamber 52.

In this gas generator, the igniter 57 is ignited by the application of power thereto under control of collision detection signals from a collision sensor and then the ignition flame is spurted into the combustion chamber 52 to force the gas generating agents 55 to be ignited and burnt, to thereby generate a large quantity of high temperature gas rapidly.

The high temperature gas generated in the combustion chamber 52 passes into the partition ring plate 54 and flows out into the inside of the filtering member 56 fitted in the cooling-and-filtering chamber 53. Then, it flows into the filtering member 56, for slag collection and cooling of the gas thereat and then flows out from gas discharging holes 51a of the housing 51 into the airbag. The airbag is then expanded and inflated rapidly by the large quantity of clean gas discharged from the gas discharging holes 51a.

In recent years, in the technical field of gas generator, reduction in size and weight of gas generator is being increasingly demanded. When viewed in this light, since the conventional gas generator forming therein the combustion chamber 52 and the cooling-and-filtering chamber 53 has a wasted space in that nothing is filled in the bore of the filtering member 56, there is a given limit in providing reduced size and weight by effectively utilizing the total volume of the housing.

In other words, in the conventional gas generator, when the housing 51 is reduced in diameter to meet the demand for reduction in size and weight, an axial length of the combustion chamber 52 of the housing 51 must be increased to ensure a necessary quantity of gas generating agents 55 packed to expand and inflate the airbag. On the other hand, when the housing 51 is reduced in its axial length, the housing 51 must be increased in diameter, for the same reason.

Also, the conventional gas generator adopts the mode that regardless of the patterns of automobile collision (low-speed collision, high-speed collision, etc.), a large quantity of gas is always discharged to inflate and expand the airbag rapidly. Consequently, the conventional gas generator cannot meet the soft inflation technology capable of providing a controlled expansion and inflation of the airbag in correspondence with the patterns of the automobile collision.

The present invention aims to provide a gas generator that can achieve reduction in size and weight by effectively utilizing the total volume of the housing, while the slag collection and the cooling of the high temperature gas can be ensured by the overall filtering member, and also can provide a controlled expansion and inflation of the airbag.

DISCLOSURE OF THE INVENTION

A gas generator of the present invention comprises an elongated cylindrical housing. The housing has, in its interior, a first combustion chamber, a third combustion chamber formed in a filtering member and a second combustion chamber which are continuously formed in this order along an axial direction of the housing. The combustion chambers are each packed with gas generating agents, and ignition means for igniting the gas generating agents is disposed in at least either of the first combustion chamber and the second combustion chamber.

With this construction, since the gas generating agents are packed in the third combustion chamber formed in the filtering member as well, the total volume of the housing can be effectively utilized for fitting the filtering member in and filling the gas generating agents in the housing. Hence, even if the housing is reduced in diameter, for example, in order to reduce the size and weight of the gas generator, a quantity of gas generating agents packed enough to expand and inflate the airbag can be ensured without increasing the axial length of the housing.

According to the gas generator of the present invention, when the ignition means is ignited by the application of power thereto, the flame is spurted into the first combustion chamber, for example. Then, the combustion runs through the housing in the order of the first combustion chamber, the third combustion chamber formed in the filtering member and the second combustion chamber. The gas generated by the burning of the gas generating agents runs sequentially from the first combustion chamber side to the second combustion chamber side through the third combustion chamber formed in the filtering member. This can allow the high temperature gas to flow into the entire filtering member.

When viewing from this, the gas generating agents packed in the third combustion chamber has the gas generating function of expanding and inflating the airbag and the flame transferring function of transferring the flame and heat generated in the first combustion chamber to the second combustion chamber.

Further, according to the gas generator of the present invention, the gas generating agents packed are made to burn in the order of the first combustion chamber, the third combustion chamber and the second combustion chamber so that the high temperature gas generated in the housing can be controlled in such a manner that a small quantity of gas can be generated, for example, in the first combustion chamber in the initial stage of combustion and thereafter a large quantity of gas can be generated in the respective combustion chambers. The ignition means may be disposed in each of the first combustion chamber and the second combustion chamber and the respective ignition means may be ignited by the application of power thereto with time difference so that the quantity of high temperature gas generated in the housing can be controlled. This enables the gas generator to meet the soft inflation technology capable of providing a controlled expansion and inflation of the airbag.

In the gas generator of the present invention, a variant structure wherein any of the first to third combustion chambers, e.g. the third combustion chamber formed in the filtering member, is packed with no gas generating agents may be adopted.

In the gas generator of the present invention, the gas generating agents in the respective combustion chambers are packed in series.

This enables the gas generating agents packed in the respective combustion chambers to be ignited and burnt continuously by igniting at least either of the gas generating agents packed in the first combustion chamber and those packed in the second combustion chamber.

In the gas generator of the present invention, the ignition means is formed by a single igniter to be ignited by the application of power thereto.

This can provide a simplified structure with no flame transfer agents for transferring the flame of the ignition means and the like arranged in the axial direction of the housing.

For example, in order for the gas generating agents in the first combustion chamber to be ignited by only the flame of the igniter, the flame, the heat and the like spurted from the igniter must be shut up in the first combustion chamber. In the gas generator of the present invention, the respective combustion chambers are formed in series along the axial direction of the housing 1 and also the third combustion chamber is formed to have a smaller diameter than the first combustion chamber and the second combustion chamber, whereby the flame and the heat are easily shut up in the first combustion chamber.

In the gas generator of the present invention, the gas generating agents packed in the first combustion chamber are made different in quantity from the gas generating agents packed in the second combustion chamber.

This enables a quantity of high temperature gas generated in the first combustion chamber and the second combustion chamber to be adjusted.

The quantity of high temperature gas generated can be adjusted by properly changing a volume ratio between the first combustion chamber and the second combustion chamber and adjusting a quantity of gas generating agents packed. Specifically, the volume ratio between the first combustion chamber and the second combustion chamber can be changed by changing the length of the filtering member or changing the position of the filtering member with respect to the housing.

In the gas generator of the present invention, the first combustion chamber is made different in volume from the second combustion chamber.

This enables a quantity of gas generating agents packed in the first combustion chamber and the second combustion chamber to be adjusted. Additionally, a quantity of high temperature gas generated can also be adjusted by adjusting the quantity of gas generating agents packed.

The volume of the first combustion chamber and the volume of the second combustion chamber can be adjusted by changing the length of the filtering member or changing the position of the filtering member with respect to the housing.

In the gas generator of the present invention, a partition member is provided at an end surface of the filtering member.

This enables the high temperature gas generated in the first combustion chamber or the second combustion chamber to be led to the third combustion chamber formed in the filtering member, without flowing out directly into the end surface of the filtering member or the respective gas discharging holes. This enables the flame and the like spurted from the ignition means to be shut up in the first combustion chamber or the second combustion chamber, and as such can allow the flame and the like from the ignition means to be effectively utilized to burn the gas generating agents easily and rapidly.

The gas generator of the present invention fits for a side airbag for side collision.

The side airbag and the like is generally built in vary limited space of an automobile. In view of this, the gas generator of the present invention can meet the demand for reduction in size and weight and is optimum for expansion and inflation of the side airbag.

BEST MODE FOR CARRYING OUT THE INVENTION

A gas generator of an embodiment of the present invention will be described with reference to FIGS. 1–3.

Figure 1:
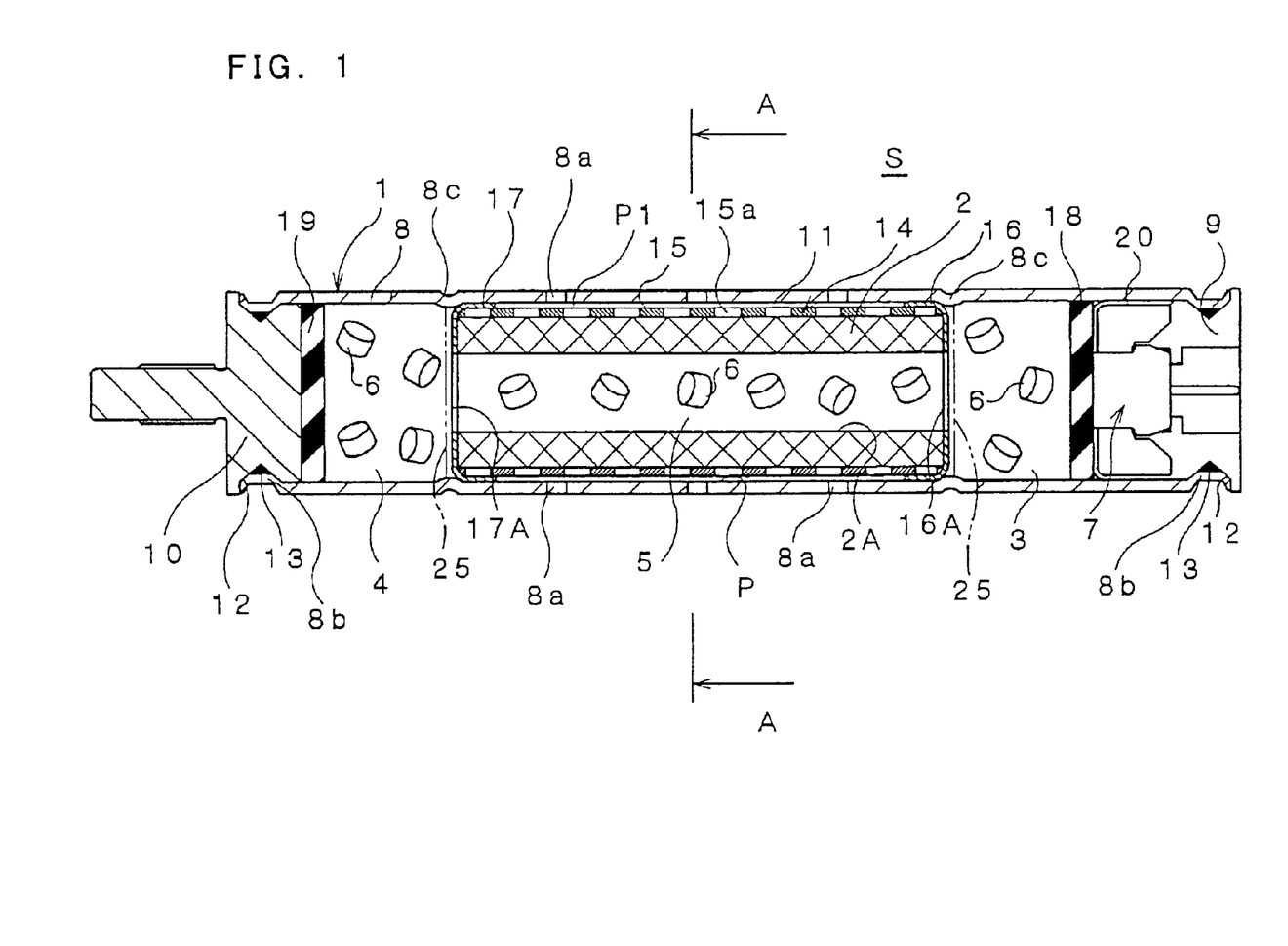
FIG. 1 is a sectional view of a gas generator of the present invention.
Figure 2:
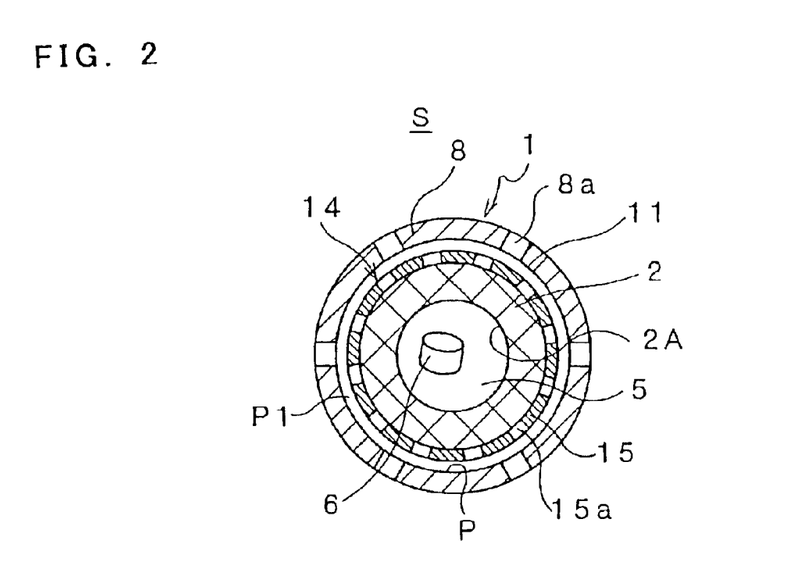
FIG. 2 is a sectional view taken along line A—A of FIG. 1.

A gas generator S shown in FIGS. 1 and 2 is mainly designed for expanding and inflating a side airbag. The gas generator S comprises an elongated cylindrical housing 1, a cylindrical filtering member 2 fitted in the housing 1, first to third combustion chambers 3–5 formed in the housing, gas generating agents 6 packed in the first to third combustion chambers 3–5 formed in the housing 1, and an ignition means 7 for forcing the gas generating agents 6 to be ignited.

The housing 1 comprises an outer cylinder 8 having openings at opposed ends thereof, a holder 9 and a plug 10 for closing the openings at the opposed ends of the outer cylinder 8. The housing 1 is structured in such a manner that after the holder 9 and the plug 10 are fitted into the openings at the opposed ends of the outer cylinder 8, the outer cylinder 8 is narrowed down around the peripheries at the ends in a drawing process, to thereby form a closed space P in the interior of the housing. In the drawing process, the end portions of the outer cylinder 8 on the opening sides are projected into V-shaped annular grooves 12 formed in the holder and the plug 10, to thereby form projections 8b, as shown in FIG. 3, and further the projections 8b are shaped along the V-shaped annular grooves 12d to be in close contact therewith (See FIG. 3). This brings seal rings 13 fitted in the annular grooves 12 into elastic contact with an inside surface around the outer cylinder 8 and the surfaces of the V-shaped annular grooves 12, whereby the interior of the housing 1 is hermetically sealed to form the closed space P. The close contact between the holder 9 and the projection 8b of the outer cylinder 8 and the close contact between the plug 10 and the projection 8b of the outer cylinder 8 permit the holder 9 and the plug 10 to be positioned in place in the outer cylinder 8 and prevented from slipping off, respectively.

The outer cylinder 8 of the housing 1 has gas discharging holes 8a formed to communicate between the closed space P and the side airbag. The gas discharging holes 8a open in an intermediate portion of the outer cylinder 8 in which the filtering member 2 is fitted, except in each axial end portion of the outer cylinder 8. These gas discharged holes 8a are formed at specified intervals in an axial direction as well as in a circumferential direction of the housing 1 and are closed off by a burst plate 11 stuck around the inside of the outer cylinder 8. The burst plate 11 is formed of a metal foil such as an aluminum foil and plays roles of protecting the interior of the housing 1 from moisture and adjusting the inner pressure.

The filtering member 2 is formed to have a length smaller than an axial dimension of the housing 1 between the holder 9 and the plug 10 and is inserted in the closed space P. This filtering member 2 is disposed concentrically to the axis of the housing 1 to extend in the axial direction of the housing 1. The filtering member 2 has an inner bore 2A formed to axially extend through the filtering member 2 in the axial direction of the housing 1.

The filtering member 2 is positioned in the intermediate portion of the outer cylinder 8 in which the gas discharging holes 8a are formed, except in each axial end portion in the housing 1. The filtering member 2 thus positioned defines a first large-diameter combustion chamber 3 and a second large-diameter combustion chamber 4 between one axial end surface of the filtering member 2 and the holder 9 at one axial end of the housing 1 and between the other axial end surface of the filtering member 2 and the plug 10 at the other axial end of the housing 1, respectively. The inner bore 2A of the filtering member 2 has a third small-diameter combustion chamber 5 extending through the filtering member in the axial direction of the housing 1. The first and second combustion chambers 3 and 4 are communicated with each other through the third combustion chamber 5. Thus, the closed space P of the housing 1 is structured to have the first combustion chamber 3, the third combustion chamber 5 and the second combustion chamber 4 which are continuously formed in this sequence along the axial dimension of the housing 1 from the holder 9 side. The filtering member 2 is produced at a low price by forming a metal wire of stocking stitch or aggregation of crimped metal wire rods into cylindrical shape.

The positioning of the filtering member 2 is performed in the drawing process in which a filter supporting member 14 is narrowed down around the outer cylinder 8. The filtering supporting member 14 comprises an inner cylinder 15 having a plurality of gas passage holes 15a and two partition caps 16 and 17. The inner cylinder 15 is fitted onto the filter material 2. The partition caps 16 and 17 are fitted in a space between an inside surface around the outer cylinder 8 and an outside surface around the inner cylinder 15 from the respective axial ends of the filtering member 2.

This fitting of the caps 16 and 17 into the outer cylinder 8 allows the filtering member 2 to be supported by the inner cylinder 15 and the partition caps 16 and 17 and also allows the filter supporting member 14 to be restricted from being moved in a radial direction of the housing 1 and thus positioned in place.

Also, the filter supporting member 14 serves to define an annular gas passage space P1 between the inside surface around the outer cylinder 8 and the outside surface around the inner cylinder 15 by fitting the partition caps 16 and 17 into the space therebetween.

Further, the partition caps 16 and 17 fitted in the space between the outer cylinder 8 and the inner cylinder 15 serve to provide apertures 16A and 17A communicating with the inner bore 2A of the filtering member 2 and also serve to close the interior of the filtering member 2 at each axial end thereof, except the inner bore 2A, whereby the high temperature gas generated in the first combustion chamber 3 or the second combustion chamber 4 is prevented from being flown out directly into the end surface of the filtering member 2 or the gas discharging holes 8a. In other words, the partition caps 16 and 17 have the function of leading the high temperature gas generated in the first large-diameter combustion chamber 3 or the second large-diameter combustion chamber 4 into the third small-diameter combustion chamber 5 through the respective apertures 16A and 17A. This can provide the effect of regulating a quantity of high temperature gas flown from the first large-diameter combustion chamber 3 or the second large-diameter combustion chamber 4 into the third small-diameter combustion chamber 5 to shut up the flame and the like spurting in the first combustion chamber 3 or the second combustion chamber 4.

After the filtering member 2 is supported by the filter supporting member 14, the outer cylinder 8 is subjected to the drawing process to narrow down around the peripheries thereof. In this drawing process, the outer cylinder 8 is narrowed down to project into the housing 1 so as to form the projections 8c to abut with the caps 16 and 17 from the each axial end of the filtering member 2. As a result of this, the projections 8c support the filtering member 2 and the filter supporting member 14 in sandwich relation therebetween and restrict their movement in the axial direction of the housing 1 by abutment with their respective caps 16 and 17 to position them in place. Also, the projections 8c are put into contact with their respective caps 16 and 17, with no space therebetween, to prevent the high temperature gas generated in the combustion chambers 3, 4 from flowing directly into the gas passage space P1 from the space between the caps 16, 17 and the inside surface around the outer cylinder 8.

The gas generating agents 6 that generate the high temperature gas by burning are packed in the first combustion chamber 3, the third combustion chamber 5 in the filtering member 2 and the second combustion chamber 4, respectively. Thus, the gas generating agents 6 are packed in all rooms in the closed space P of the housing 1, except the filtering member 2, and are disposed continuously along the axial direction of the housing 1.

The gas generating agents 6 are prevented from being pulverized by vibration by two cushioning members 18 and 19. The cushioning member 18 is placed between a cushioning member holding member 20 mounted on the holder 9 and the gas generating agents 6 and is fitted in the first combustion chamber 3. A cross-shaped notch is formed in the cushioning member 18. The cushioning member 19 is placed between the plug 10 and the gas generating agents 6 and is fitted in the second combustion chamber 4. Elastic material, such as silicon rubber and silicon foam, is preferably used as the cushioning members 18 and 19.

The ignition means 7 is formed solely by an igniter which is ignited by the application of power thereto and fitted in the holder 9 from the inside of the housing 1. The ignition means 7 is disposed to project toward the first combustion chamber 3 and is in abutment with the cushioning member 18. This ignition means 7 is ignited by the application of power thereto under control of collision detection signals from a collision sensor and then the ignition flame is spurted into the first combustion chamber 3 to force the gas generating agents 6 packed in the first combustion chamber 3 to be ignited.

Next, operation of the gas generator S will be described below.

When automobile collision is detected by the collision sensor, the ignition means 7 is ignited by the application of power thereto. The ignition flame of the ignition means 7 bursts the cushioning member 18 and then spurts into the first combustion chamber 3 to force only the gas generating agents 6 packed in the first combustion chamber 3 to be ignited, whereby the high temperature gas is generated. At this time, the ignition flame and the heat of the high temperature gas generated from the ignition means 7 are prevented from flowing directly into the axial end of the filtering member 2 and the gas discharging holes 8a by the partition cap 16 and are led into the third combustion chamber 5. As a result of this, a quantity of high temperature gas flowing from the first large-diameter combustion chamber 3 into the third small-diameter combustion chamber 5 is regulated and, as a result, the flame and the heat of the high temperature gas are shut up in the first combustion chamber 3. This forces the gas generating agents 6 to be ignited and burnt easily and rapidly.

The high temperature gas generated in the first combustion chamber 3 flows into the third combustion chamber 5 formed in the inner bore 2A of the filtering member 2 through the aperture 16A of the cap 16, first; then flows into the filtering member 2 for slag collection and cooling of the gas thereat; and thereafter flows out into the gas passage space P1.

At this time, the gas generating agents 6 packed in the third combustion chamber 5 are ignited and burnt by the flame and the high temperature gas flowing therein to thereby generate the high temperature gas there. The gas generating agents 6 in the third combustion chamber 5 are burnt in sequence from the first combustion chamber 3 side, resulting in that the combustion in the third combustion chamber 5 is sequentially transmitted therefrom toward the second combustion chamber 4. This indicates that the gas generating agents 6 packed in the third combustion chamber 5 have the gas generating function of expanding and inflating the airbag and the flame transferring function of transferring the flame and heat generated in the first combustion chamber 3 to the second combustion chamber 4.

When the gas pressure in the closed space P increases with the combustion in the housing 1 and reaches a predetermined pressure, the burst plate 11 is broken, so that clean gas uniformed in the gas passage space P1 is discharged from the gas discharging holes 8a into the airbag.

With this, the airbag starts to be expanded and inflated slowly by a small quantity of gas generated in the first combustion chamber 3 only or in the first and third combustion chambers 3 and 5.

Sequentially, when not only the combustion in the first combustion chamber 3 but also the combustion in the third combustion chamber 5 proceed, the flame and high temperature gas generated by the combustion in the third combustion chamber 5 are mainly spurted out from the aperture 17A of the partition cap 17 into the second combustion chamber 4 with very small time difference from after the start of the combustion in the third combustion chamber 5. As a result of this, the gas generating agents 6 packed in the second combustion chamber 4 are ignited and burnt and thereby the high temperature gas is generated in the second combustion chamber 4. Then, the high temperature gas generated in the second combustion chamber 4 flows into the third combustion chamber 5. Then, it flows into the filtering member 2, for slag collection and cooling of the gas thereat and then flows into the gas passage space P1. The gas flowing into the gas passage space P1 is uniformed there and discharged from the gas discharging holes 8a into the airbag. This makes the airbag go on to a rapid expansion and inflation by a large quantity of clean gas discharged from the respective combustion chambers 3–5.

As a result of this, the airbag starts to be expanded and inflated slowly in the initial stage of inflation by a small quantity of gas generated in the first combustion chamber 3 only or in the first and third combustion chambers 3, 5, first, and then is rapidly expanded and inflated, after passing a minute time, by a large quantity of gas generated in the respective combustion chambers 3–5.

Thus, according to the gas generator S of the present invention, since the gas generating agents 6 are packed in the third combustion chamber 5 formed in the filtering member 2 as well, the total volume of the housing can be effectively utilized for fitting the filtering member 2 in and filling the gas generating agents 6 in the housing. Hence, even if the housing 1 is reduced in diameter, for example, in order to reduce the size of the gas generator S, a necessary quantity of gas generating agents 6 packed to expand and inflate the airbag can be ensured without changing the linear dimension of the housing 1.

In addition, since the gas generating agents 6 in the housing 1 are burnt in the order of the first combustion chamber 3, the third combustion chamber 5 and the second combustion chamber 4, the high temperature gas is dispersed over the entire filtering member 2 and is flown into the filtering member 2. Hence, the filtering member 2 can be prevented from being damaged resulting from the thermally melting and the like and, resultantly, the minute slag can be prevented from being discharged into the airbag.

Further, since the gas generating agents 6 are burnt in sequence from the first combustion chamber 3 in the housing 1, the quantity of gas generated in the housing 1 can be regulated in such a manner that a small quantity of gas is generated in the first combustion chamber 3 only or in the first and third combustion chambers in the initial stage of combustion and, after passing a minute time, a large quantity of gas is generated in the respective combustion chambers 3–5. This enables the gas generator of the present invention to meet the soft inflation technology capable of providing a controlled expansion and inflation of the airbag, thus enabling the airbag to fulfill its originally intended function.

In the gas generator of the present invention, the control pattern of expansion and inflation of the airbag can be adjusted by properly changing the quantity of gas generating agents 6 packed in the respective combustion chambers 3–5.

Specifically, the dimension of the filtering member 2 may be increased to reduce the volume of the first and second combustion chambers 3, 4 and also reduce the quantity of gas generating agents 6 packed therein. On the other hand, the dimension of the filtering member 2 may be decreased to increase the volume of the first and second combustion chambers 3, 4 and also increase the quantity of gas generating agents 6 packed therein. This can allow the quantity of gas generating agents 6 packed in the first and second combustion chambers 3, 4 to be adjusted, and as such can allow the quantity of gas discharged from the first and second combustion chambers 3, 4 into the airbag to be properly changed, so as to change the control pattern of the expansion and inflation of the airbag. The volume percentage of the third combustion chamber 5 can also be changed by changing the dimension of the filtering member 2, and as such can allow the quantity of gas generating agents 6 packed in the third combustion chamber 5 and the quantity of gas generated in the third combustion chamber 5 to be also adjusted.

Alternatively, the volume ratio between the first combustion chamber 3 and the second combustion chamber 4 may be changed by changing the fitting position of the filtering member 2, rather than by changing the dimension of the filtering member 2, to adjust the quantity of gas generating agents packed in the first and second combustion chambers 3, 4. For example, the fitting position of the filtering member 2 can be shifted from the position shown in FIG. 1 toward the holder 9, to reduce the volume of the first combustion chamber 3 and increase the volume of the second combustion chamber 4. On the other hand, the fitting position of the filtering member 2 can be shifted toward the plug 10, to increase the volume of the first combustion chamber 3 and reduce the volume of the second combustion chamber 4.

Although the gas generator S of the present invention has been described with an example of the side airbag for side collision, the gas generator of the present invention is applicable to the passenger-side airbag built in the instrument panel, as well as to the side airbag.

Figure 3:
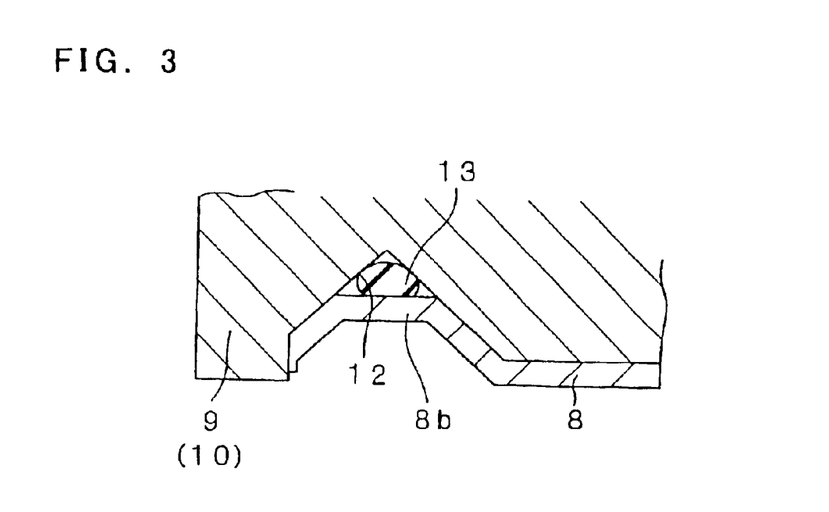
FIG. 3 is an enlarged view of a principal part of the caulked structure of an outer cylinder and a cover member of the gas generator of FIG. 1.

The gas generator used for expanding and inflating the passenger-side airbag usually having an elongated cylindrical housing can be reduced in size and weight by applying the structure shown in FIGS. 1–3 thereto.

While the gas generator S of the present invention illustrated above takes the structure wherein the gas generating agents 6 are ignited by the single ignition means 7, it can also take the structure wherein the plug 10 of the housing 1 is also fitted with the ignition means so as to controllably expand and inflate the airbag. In this variant, the two ignition means may be selectively ignited by the application of power thereto so that the expansion and inflation of the airbag can be controlled. Specifically, the respective ignition means can be ignited by the application of power thereto simultaneously so that the airbag can be expanded and inflated rapidly by a large quantity of gas generated in the respective combustion chambers. Alternatively, the respective ignition means can be ignited by the application of power thereto with small time difference so that the airbag can be expanded and inflated slowly in the initial stage of inflation by a small quantity of gas generated in the first combustion chamber, first, and then can be rapidly expanded and inflated, after passing a minute time, by a large quantity of gas generated in the respective combustion chambers.

Further, the gas generator of the present invention may take the structure wherein the aperture 16A of the partition cap 16 on the ignition means 7 side is closed off by a burst plate 25 and the like so that the first combustion chamber 3 can be blocked off from the third combustion chamber 5 formed in the filtering member in the initial stage of combustion.

With this structure, the first combustion chamber 3 is blocked off from the interior of filtering member 2 at the axial end thereof, the respective gas discharging holes 8a and the third combustion chamber 5 by the partition cap 16 and the burst plate 25 and, as a result, the flame and the heat of the high temperature gas spurted out from the ignition means 7 are shut up in the first combustion chamber 3 in the initial stage of combustion. Thus, the combustion in the first combustion chamber 3 enables the gas generating agents 6 to be burnt easily and rapidly through the effective utilization of the flame of the ignition means 7 and the heat of the high temperature gas generated by the burning of the gas generating agents 6 packed therein. The burst plate 25 is burst as a result of an increased inner pressure of the first combustion chamber 3 and the flame.

As a result of this, even when the ignition means 7 is formed by only the single igniter, the gas generating agents 6 in the first combustion chamber 3 can be ignited and burnt adequately by only the flame of the single igniter.

While in the illustration, the gas generating agents 6 are packed continuously in the order of the first combustion chamber 3, the third combustion chamber 5 and the second combustion chamber 4, the present invention is not limited to this illustrated embodiment. For example, the gas generating agents 6 may be packed discontinuously by a partition member that can be broken by the burning of the gas generating agents 6 being provided between the combustion chambers 3 and 5, or 5 and 4. Further, the structure wherein additional spaces are formed among the respective combustion chambers 3–5 may be adopted.

Further, while the structure wherein the first to third combustion chambers 3–5 are all packed with the gas generating agents 6 has been described above, the structure wherein any of the combustion chambers 3–5 is packed with no gas generating agents 6 may be adopted. The gas generating agents 6 in the third combustion chamber 5, in particular, have the function of leading the high temperature gas and the flame generated in the first combustion chamber 3 into the second combustion chamber 4. In view of this, if the high temperature gas and the flame generated in the first combustion chamber 3 can be adequately led into the second combustion chamber 4 through the inner bore 2A of the filtering member 2, there is no need for the third combustion chamber 5 to be packed with the gas generating agents 6 to ignite and burn the gas generating agents 6 in the second combustion chamber 4.

Next, the test result on the applicability of the gas generator S of the present invention to the soft inflation technology will be described with reference to FIG. 4.

In the test, the pressure rise characteristic was measured in comparison between the gas generator of the present invention (FIG. 1) and the conventional gas generator (FIG. 5).

The pressure rise characteristic was measured in a 60 liter tank test. It is to be noted that the 60 liter tank test is the test wherein after the gas generator is placed in a stainless steel tank having a volume of 60 liter and the tank is hermetically sealed, the igniter is ignited by the application of power thereto to generate the gas and, then, change in the inner pressure of the tank (a rate of pressure rise) caused by the generated gas is measured in relation to elapsed time (millisecond).

Figure 4:
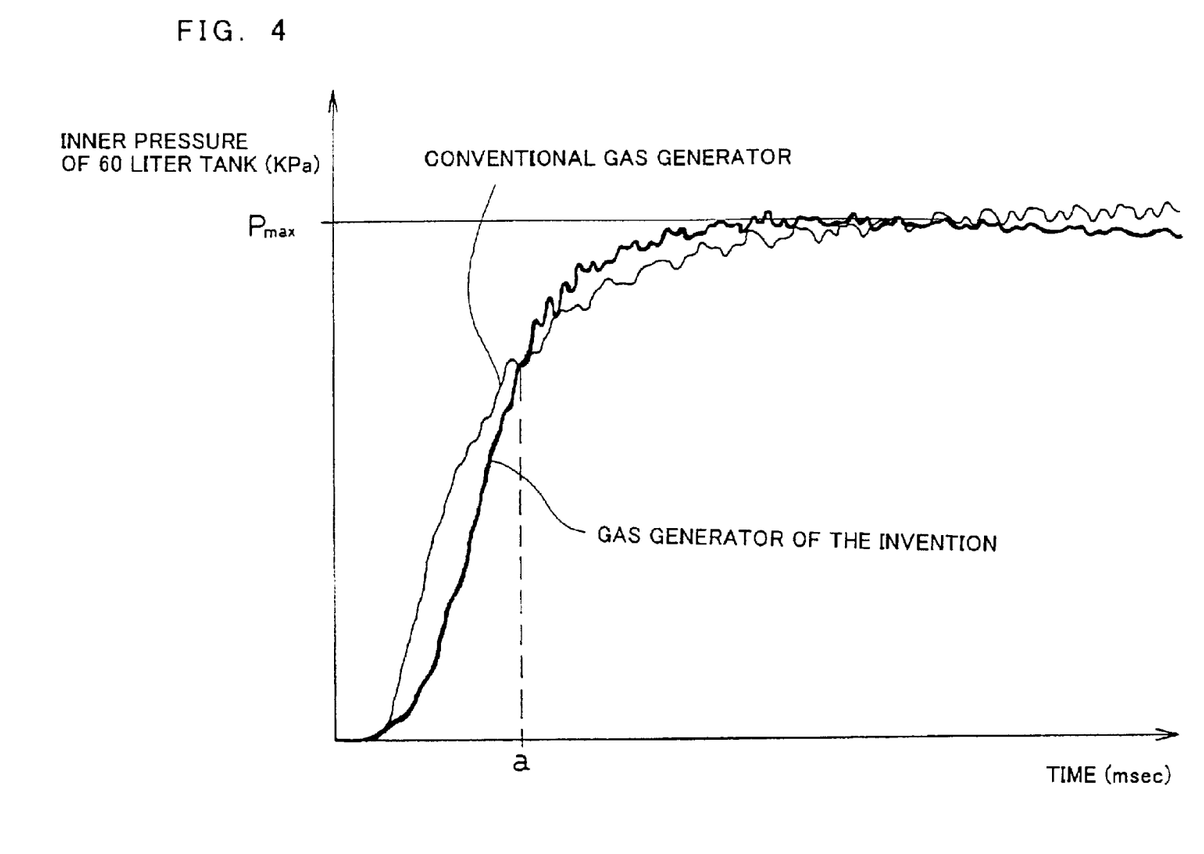
FIG. 4 is graph of a 60 liter tank test result of the gas generator of the present invention and the conventional gas generator, showing the relation between an inner pressure of the tank (kPa) and time (millisecond).

The test result on the pressure rise characteristic in comparison between the gas generator of the present invention and the conventional gas generator is shown in FIG. 4.

The test result shows that the gas generator of the present invention has the rate of pressure rise which is moderate in the initial stage of combustion of the gas generating agents, as compared with the conventional gas generator. Then, from a point of time "a" after a predetermined time (millisecond) passed, the gas generator of the present invention increases in pressure and reaches the maximum pressure Pmax with a sharper pressure rise than the pressure rise in the conventional gas generator.

This stems from the construction of the gas generator of the present invention wherein the gas generating agents are burnt sequentially in the order of the first combustion chamber, the third combustion chamber and the second combustion chamber with minute time difference. It also stems from the construction of the gas generator of the present invention wherein when the gas generating agents in the first combustion chamber are ignited and burnt, the high temperature gas generated in the first combustion chamber flows into the third combustion chamber and then into the second combustion chamber, so that the initial combustion in the first combustion chamber is performed with the total volume of the housing and thus the rate of pressure rise is suppressed.

Thus, according to the gas generator of the present invention, the airbag can be moderately expanded and inflated in the initial stage of expansion and inflation of the airbag by a small quantity of low-pressure gas whose rate of pressure rise was suppressed and then can be made to go on to a rapid expansion and inflation by a large quantity of gas that reached the maximum pressure with a predetermined rate of pressure rise.

As a result of this, the gas generator of the present invention comes to have an optimum pressure rise characteristic for the soft inflation technology. In contrast to this, the conventional gas generator cannot be applied to the soft inflation technology, because it has a sharp pressure rise characteristic from the initial stage of burning of the gas generating agents.

It should be noted that the point "a" in FIG. 4 can be adjusted, for example, by changing the volume ratio between the first combustion chamber 3 and the second combustion chamber 4 or the proportion of quantity of gas generating agents packed therein. Accordingly, in the gas generator of the present invention, a desirable gas generation pattern can be properly selected.

CAPABILITY OF EXPLOITATION IN INDUSTRY

The present invention can meet the demand for reduction in size and weight of the gas generator and can provide an optimum pressure rise characteristic for the expansion and inflation of the side airbag for side collision.

What is claimed is:

1. A gas generator comprising:
   an elongated cylindrical housing closed at both axial ends thereof;
   a filtering member inserted in an intermediate portion of the housing having gas discharging holes and having a through bore extending along an axial direction of the housing;
   first and second combustion chambers formed at both axial end portions of the housing and configured to pack gas generating agents, respectively;
   a third combustion chamber formed in the through bore of the filtering member and configured to pack gas generating agents; and
   an ignition, disposed in at least one the first combustion chamber and the second combustion chamber configured to ignite the gas generating agents, wherein
   the third combustion chamber has a diameter smaller than each of the first and second combustion chambers.

2. The gas generator according to claim 1, wherein the gas generating agents are packed continuously in the first combustion chamber, the second combustion chamber, and the third combustion chamber, respectively.

3. The gas generator according to claim 1, wherein the ignition is formed only by an ignitor to be ignited by application of power.

4. The gas generator according to claim 1, wherein the gas generating agents packed in the first combustion chamber are different in quantity from the gas generating agents packed in the second combustion chamber.

5. The gas generator according to claim 1, wherein the first combustion chamber has a different volume than that of the second combustion chamber.

6. The gas generator according to claim 1, further comprising a partition member at an end surface of the filtering member confronting one of the first combustion chamber and the second combustion chamber.

7. The gas generator according to claim 1, which is used to inflate a side airbag for side collision.

8. The gas generator according to claim 1, wherein said first, third, and second combustion chambers are continuously formed serially in this order along an axial direction of the housing.

9. The gas generator according to claim 1, wherein the first combustion chamber is not formed in the through bore of a filtering member, and wherein the second combustion chamber is not formed in the through bore of a filtering member.

10. The gas generator according to claim 2, wherein the first combustion chamber has a different volume than that of the second combustion chamber.

11. The gas generator according to claim 3, wherein the first combustion chamber has a different volume than that of the second combustion chamber.

12. The gas generator according to claim 4, wherein the first combustion chamber has a different volume than that of the second combustion chamber.

13. The gas generator according to claim 8, wherein the first combustion chamber is not formed in the through bore of a filtering member, and wherein the second combustion chamber is not formed in the through bore of a filtering member.

* * * * *